(No Model.) 3 Sheets—Sheet 1.

T. TOWNSEND.
DRILLING MACHINE.

No. 389,722. Patented Sept. 18, 1888.

Witnesses:
John E. Parker
Alex. Barkoff

Inventor:
Thomas Townsend
by his Attorneys
Howson & Howson (No Model.) 3 Sheets—Sheet 2.

T. TOWNSEND.
DRILLING MACHINE.

No. 389,722. Patented Sept. 18, 1888.

Witnesses:
John E. Parker
Alex. Barkoff

Inventor:
Thomas Townsend
by his Attorneys
Howson & Howson (No Model.) 3 Sheets—Sheet 3.
T. TOWNSEND.
DRILLING MACHINE.
No. 389,722. Patented Sept. 18, 1888.
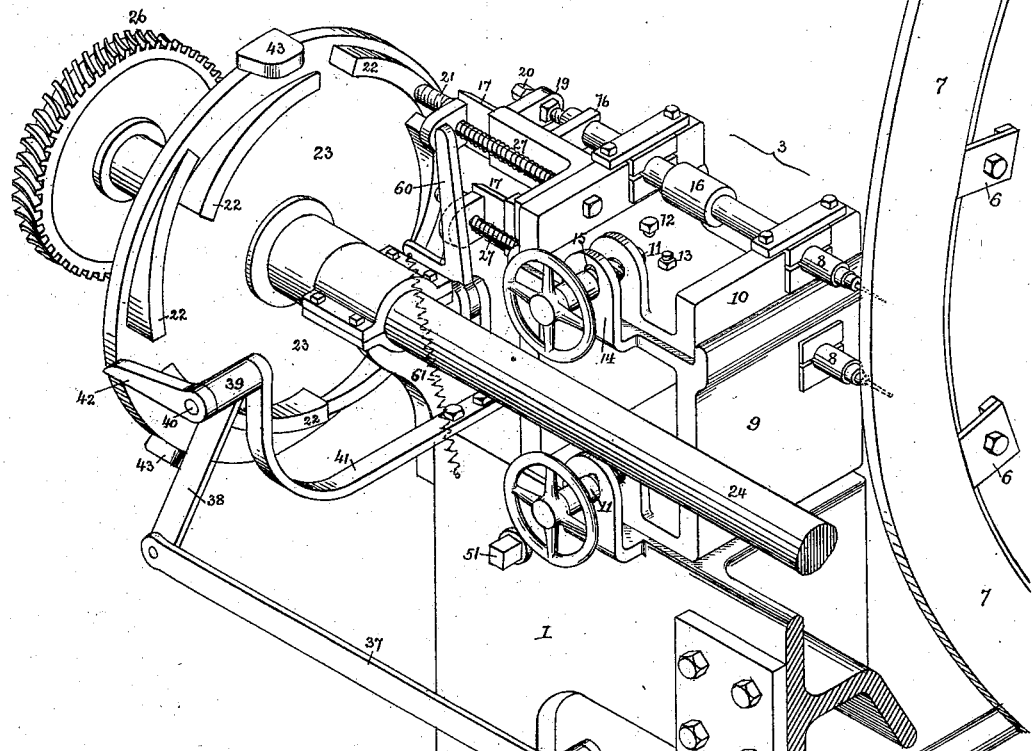
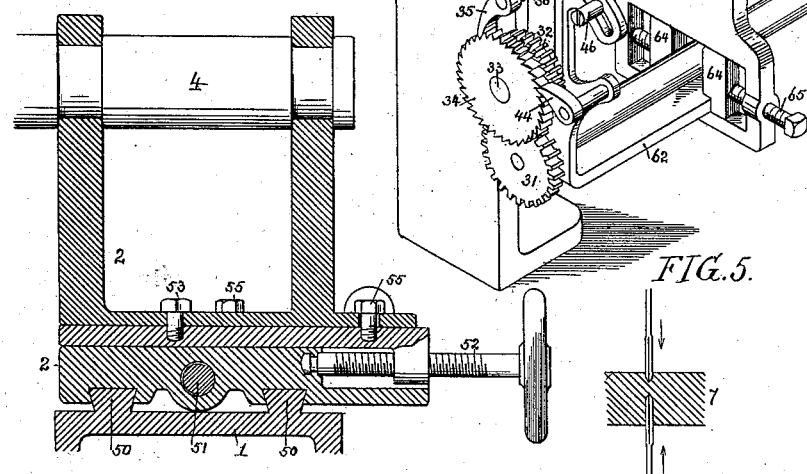
Witnesses:
John E. Parker
Hy. Barkoff
Inventor:
Thomas Townsend
by his Attorneys
Howson & Howson

UNITED STATES PATENT OFFICE.

THOMAS TOWNSEND, OF PHILADELPHIA, PENNSYLVANIA.

DRILLING-MACHINE.

SPECIFICATION forming part of Letters Patent No. 389,722, dated September 18, 1888.

Application filed February 20, 1888. Serial No. 264,579. (No model.)

*To all whom it may concern:*

Be it known that I, THOMAS TOWNSEND, a subject of the Queen of Great Britain and Ireland, and a resident of Philadelphia, Pennsylvania, have invented certain Improvements in Drilling-Machines, of which the following is a specification.

My invention consists of a drilling-machine especially devised for the purpose of forming a series of circumferential rows of openings in an annular plate or ring, my invention comprising certain details in the construction of the machine with the view, mainly, of insuring accuracy and rapidity in the operation of the machine.

Figure 1:
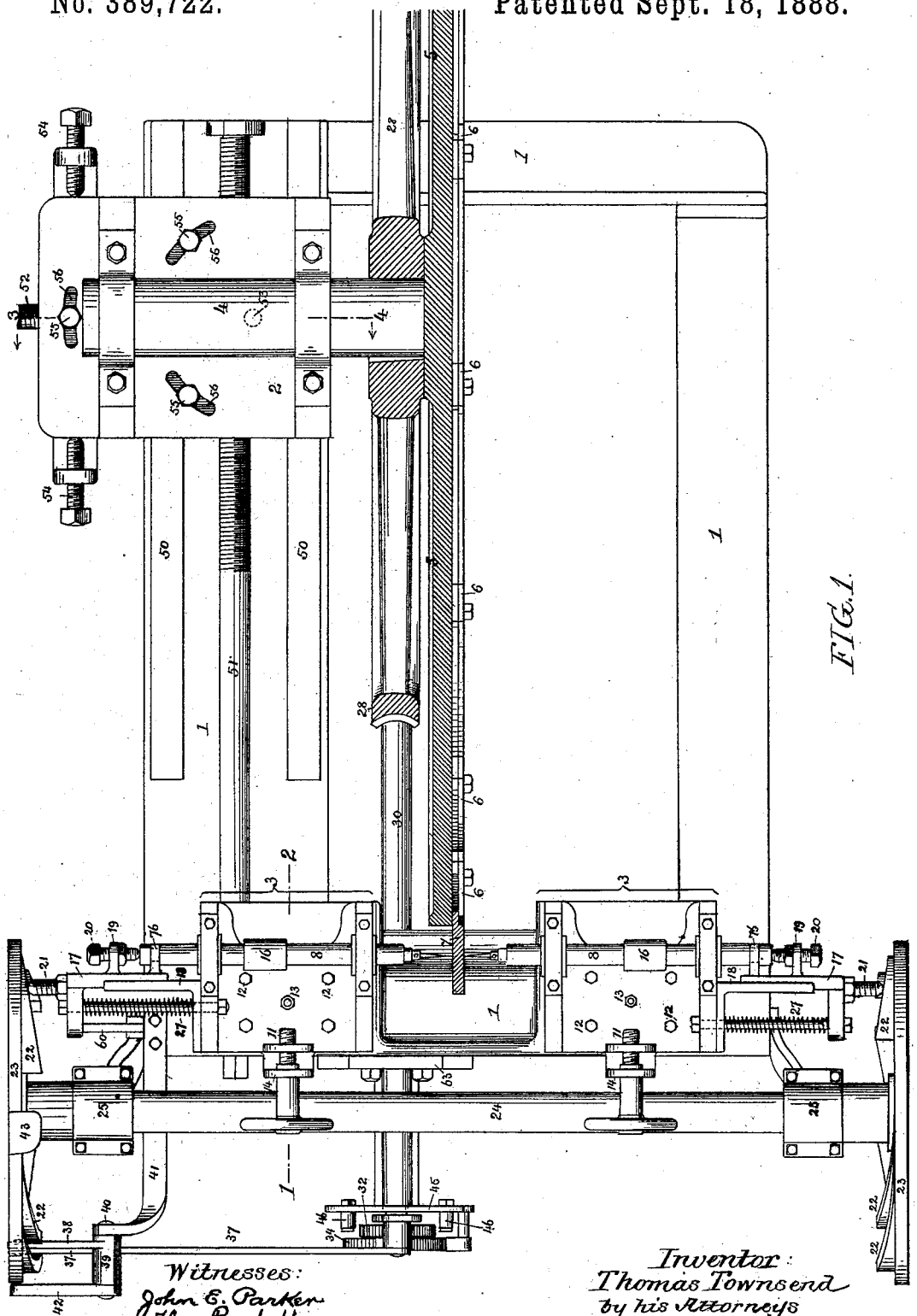
Figure 2:
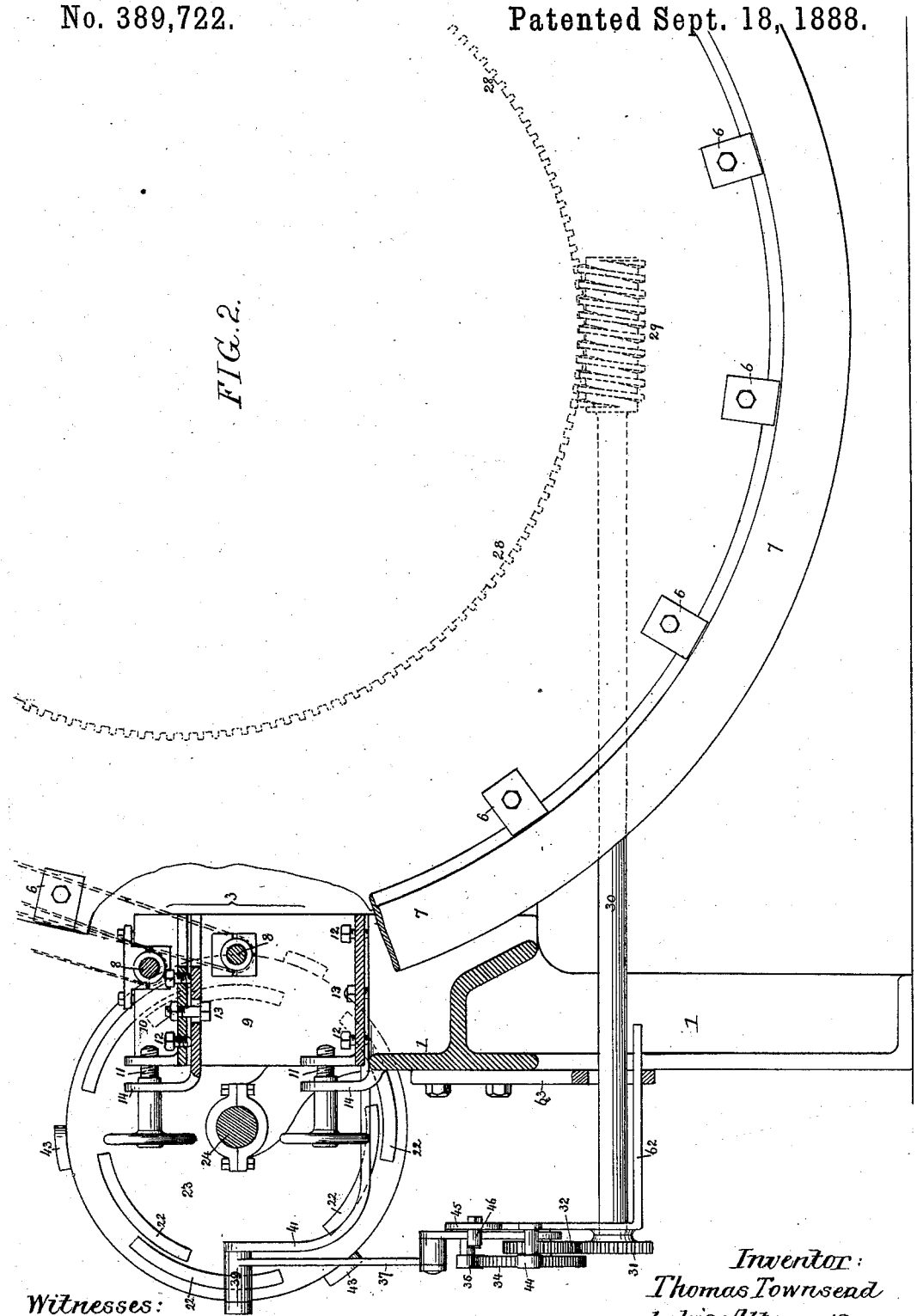

In the accompanying drawings, Figure 1 is a plan view, partly in section, of a drilling-machine constructed in accordance with my invention. Fig. 2 is a view of the same, partly in elevation and partly in section, on the line 1 2, Fig. 1. Fig. 3 is a perspective view of part of the machine. Fig. 4 is a transverse section on the line 3 4, Fig. 1; and Figs. 5 and 6 are diagrams illustrating the operation of the machine.

The fixed frame 1 of the machine has formed on it suitable bearings for the work-holding carriage 2 and for opposite drill-carriages 3 3, the carriage 2 having bearings for a shaft, 4, carrying the face-plate 5, to which is secured by clamps 6 the annular plate or ring 7, in which the rows of openings are to be formed, said ring projecting between the drills of the opposite carriages, and each carriage in the present instance being provided with two drill-spindles, 8, the drills of each carriage being directly opposite those of the other carriage and being arranged in different circumferential planes, as shown by dotted lines in Fig. 2, so that while one pair of drills forms one circumferential row of holes the other pair will form another and independent row parallel with the first.

Each drill-carriage 3 comprises two parts, 9 and 10, Figs. 2, 3, the part 9 carrying one of the drill-spindles and the part 10 carrying the other spindle. The part 9 of the carriage is adjustable radially in respect to the shaft 4 by means of a screw-stem, 11, and the part 10 of the carriage is adjustable both radially and vertically on the part 9, the vertical adjustment being effected by means of adjusting-screws 12 and a locking-nut, 13, and the radial adjustment being effected by a screw, 11, which is confined longitudinally to but is free to move vertically in a bracket, 14, on the part 9 of the carriage, a slot, 15, being formed in said bracket to permit this vertical movement.

Each drill-spindle has a pulley, 16, Figs. 1, 3, so that it can be driven by a belt from any suitable counter-shaft, and the rear end of each spindle is grooved for adaptation to a forked lug, 76, projecting from a slide, 17, guided in a suitable bracket, 18, on the drill-carriage, said slide being also provided with another lug, 19, which has a set-screw, 20, bearing on the end of the drill-spindle, whereby the lug 76 is relieved from the backward thrust of the drill.

Each slide 17 has an adjustable bearing-screw, 21, which is acted upon by a series of cams, 22, on a disk, 23, carried by a shaft, 24, adapted to bearings 25 on the fixed frame of the machine, and driven in any suitable manner, preferably by means of a worm-wheel, 26, on the outer end of the shaft, as shown in Fig. 3, the slides 17 being projected by means of springs 27, so as to cause their screws 21 to bear on the cams 22.

Each cam-disk 23 has two sets of cams 22, arranged in different circumferential planes, so as to act upon the slides 17 of the drill-spindles 8 of one of the drill-carriages, the inner set of cams being located so far in advance of the other set that both drill-spindles will be projected simultaneously by the action of said cams.

The throw of each drill-spindle is sufficient to carry its drill a little more than half-way through the annular plate or ring 7; hence, in order to prevent the drills from meeting in the center of the ring, one drill is operated slightly in advance of the other, so that it is fully projected and partially retracted before the opposite drill reaches the limit of its inward movement, as will be understood on reference to the diagrams, Figs. 5 and 6.

In order to provide for the intermittent circumferential adjustment of the ring in the intervals between the actions of the drills, the shaft 4 has a worm-wheel, 28, Fig. 1, which engages with a worm, 29, on a shaft, 30, Fig.

3, the outer end of which is geared by means of spur-wheels 31 and 32 to a shaft, 33, carrying a ratchet-wheel, 34, with which engages a pawl, 35, hung to an arm, 36, connected by a rod, 37, to an arm, 38, on a rock-shaft, 39, free to turn on a spindle, 40, carried by an arm, 41, of the frame, said rock-shaft also having an arm, 42, which is acted upon by lugs 43 on the periphery of one of the cam-disks 23, whereby, on each rotation of the latter, there will be a number of vibrations of the pawl-carrying arm 36 and a consequent succession of movements of the ratchet-wheel 33 to the extent of one or more teeth, back movement of the wheel being prevented by a retaining-pawl, 44, as shown in Fig. 3.

To prevent excessive movement of the arm 36 in either direction, a segmental bar, 45, on the frame carries opposite adjustable pins 46, which serve as stops for said arm.

The carriage 2 is adjustable longitudinally on the frame of the machine, being adapted to guides 50 thereon, Fig. 4, and having a nut for the reception of a screw-shaft, 51, transverse adjustment of the carriage being also effected by means of a screw, 52. The carriage is made in two parts, the upper of which is pivoted to the lower at 53, and said upper part of the carriage, which has bearings for the shaft 4, can be adjusted to different angles by means of set-screws 54, being secured in position after adjustment by set-screws 55, which are adapted to segmental slots 56 in the upper part of the carriage, as shown in Fig. 1. It will thus be seen that accurate adjustment of both the annular plate or ring and the drills in respect to each other is provided for, and the openings formed in said annular plate or ring may be either straight or inclined.

In some cases it may be desirable to form wedge-shaped openings in the annular plate or ring, in which event, after the openings have been formed therein by the drills, a slotting-tool may take the place of one of the drills and the others may be thrown out of action, the plate or ring being adjusted to such angle as may be required to form an opening of the required bevel therein.

In this case the spring 27 may not be strong enough to retract the drill-slide; hence I provide the machine with a bell-crank lever, 60, Fig. 3, this lever being acted upon by a spring, 61, and acting upon a lug on the drill-slide, 17, so as to aid the spring 27 in effecting the retraction of the latter, the spring 61 being uncoupled except when the slotting-tool is being used.

The frame 62, Fig. 3, carrying the bearing for the outer end of the shaft 30, which drives the work-carrying shaft 4, is adapted to a slot in a bracket, 63, Figs. 2, 3, on the main frame, and is confined between blocks 64, the position of which is controlled by set-screws 65, so that said frame can be adjusted longitudinally, as may be required by the varying angles imparted to the work-carrying plate or disk 5.

It will be seen that the above-described machine is entirely automatic in its action, and that the various adjustments of the parts insure accuracy in the disposal of the openings in the annular plate or ring, while rapid operation is insured by the use of a series of drill-spindles and by working said spindles in pairs, each drill passing but part way through the ring, as the openings can be made much more rapidly in this way than when a single drill passing completely through the ring from one side to the other is employed.

Although I have shown on each drill-carriage two spindles so located as to effect the formation of two concentric rows of openings in the annular plate or ring, the number of drill-spindles on each carriage may be increased, if desired, so as to form more than two rows of openings, or; on the other hand, each carriage may have but a single drill-spindle.

Having thus described my invention, I claim and desire to secure by Letters Patent—

1. The combination of the pair of drill-spindles located on opposite sides of the work and having coinciding axes, with cams for moving said drill-spindles to and from the work, the cams of one spindle having a lead on those of the other spindle, whereby one drill commences to act on the work slightly in advance of the other drill and starts on the return movement before the other drill is fully into the work, all substantially as specified.

2. The combination of the rotating work-holder with a series of drill-spindles having their axes in different circumferential planes in respect to the axis of said work-holder, whereby two or more concentric rows of openings are simultaneously formed, all substantially as specified.

3. The combination of the work-holder, the drill-carriage, and the drill-spindle guided so as to be free to slide longitudinally thereon, the rotating cam-disk, and the slide connected to the drill spindle and having an adjustable bearing-pin for the action of the cams, all substantially as specified.

4. The combination of the drill-carriage, the spindle free to slide longitudinally thereon, and the slide having a lug engaging with a reduced portion of the spindle, and a set-screw forming an end bearing for said spindle, all substantially as specified.

5. The combination of the work-holder, the drill-carriage having two or more sliding drill-spindles in different planes thereon, and a rotating disk having two or more sets of cams for operating said spindles, said cams being likewise located in different planes, all substantially as specified.

6. The combination of the work-holder with a drill-carriage made in two parts, each carrying a drill-spindle, one part of the carriage and its spindle being adjustable in respect to the other, all substantially as specified.

7. The combination of the fixed frame and the drill-carriage mounted thereon with a work-holder and a carriage therefor, having a pivoted section with bearings for the work-holder shaft, whereby the angle of the work in respect to the drills may be changed, all substantially as specified.

8. The combination of the work-holder and its carriage, having a pivoted portion to permit angular adjustment of said work-holder, with an operating-shaft, and adjustable bearings for the outer end of the latter, whereby it may be shifted to suit the angle of the work-holder, all substantially as specified.

9. The combination of the drill-carriage and its drill-spindle, the slide connected thereto, the disk having cams for acting on said slide, the retracting-spring for the slide, and a supplementary lever and spring, also serving to retract the slide, all substantially as specified.

In testimony whereof I have signed my name to this specification in the presence of two subscribing witnesses.

THOMAS TOWNSEND.

Witnesses:
JOHN E. PARKER,
HARRY SMITH.